US008055148B2

(12) United States Patent
Tao

(10) Patent No.: US 8,055,148 B2
(45) Date of Patent: Nov. 8, 2011

(54) IMAGE FORMING APPARATUS AND METHOD IN WHICH PRINTING TIME IS SHORTENED AND PRINTING ENGINE IS NOT DRIVEN UNNECESSARILY, AND RECORDING MEDIUM STORING PROGRAM FOR SAME

(75) Inventor: Kozo Tao, Osaka (JP)

(73) Assignee: KYOCERA MITA Corporation, Osaka (JP)

( * ) Notice: Subject to any disclaimer, the term of this patent is extended or adjusted under 35 U.S.C. 154(b) by 537 days.

(21) Appl. No.: 12/236,176

(22) Filed: Sep. 23, 2008

(65) Prior Publication Data

US 2009/0092416 A1 Apr. 9, 2009

(30) Foreign Application Priority Data

Oct. 9, 2007 (JP) ................................ 2007-262915

(51) Int. Cl.
*G06F 15/00* (2006.01)
*G06F 3/12* (2006.01)
*G06K 15/00* (2006.01)
*G03G 15/00* (2006.01)

(52) U.S. Cl. ......... 399/82; 358/1.5; 358/1.15; 358/1.16; 399/388

(58) Field of Classification Search ................... 399/154
See application file for complete search history.

(56) References Cited

U.S. PATENT DOCUMENTS

| | | | | |
|---|---|---|---|---|
| 5,825,994 A * | 10/1998 | Kumada | ....................... | 358/1.17 |
| 6,362,870 B2 * | 3/2002 | Mui et al. | ....................... | 355/24 |
| 6,819,447 B1 * | 11/2004 | Sawano | ....................... | 358/1.16 |
| 7,430,054 B2 * | 9/2008 | Masumoto et al. | .......... | 358/1.14 |
| 2004/0179211 A1 * | 9/2004 | Burkes et al. | .................. | 358/1.5 |
| 2005/0200872 A1 * | 9/2005 | Newell et al. | ................ | 358/1.13 |
| 2007/0097434 A1 * | 5/2007 | Tao | ............................. | 358/1.16 |
| 2007/0216084 A1 * | 9/2007 | Hashimoto | .................. | 271/186 |

FOREIGN PATENT DOCUMENTS

| | | | |
|---|---|---|---|
| JP | 2008-009216 | | 1/2008 |
| JP | 2008006740 A | * | 1/2008 |
| JP | 2008009216 A | * | 1/2008 |

* cited by examiner

*Primary Examiner* — David Gray
*Assistant Examiner* — David Bolduc
(74) *Attorney, Agent, or Firm* — Frommer Lawrence & Haug LLP

(57) ABSTRACT

Embodiments relate to an image forming apparatus including a print job input unit; an image data storing unit that stores the image data by dividing the image data into a band basis; a job managing unit that outputs a primary sheet supply numerical order of the band and an image data delivery numerical order of the band; an image data output control unit that acquires the image data on the band basis from the image data storing unit, outputs primary sheet supply permission information and delivery permission information to a print engine control unit, and outputs the image data to the printing engine; and the printing engine control unit that outputs the primary sheet supply permission information and the delivery permission information to the printing engine, and controls the primary sheet supply and the delivery of the image data.

18 Claims, 4 Drawing Sheets

MANAGEMENT INFORMATION

| JOB KIND | M-TH (PRIMARY SHEET SUPPLY PERMISSION) | N-TH (IMAGE DELIVERY PERMISSION) |
|---|---|---|
| PRINTER JOB | 20 BANDS | TWO BANDS BEFORE LAST BAND |
| COPY JOB | 0 BAND | 10 BANDS |
| FACSIMILE JOB | 5 BANDS | TWO BANDS BEFORE LAST BAND |

FIG. 2

IMAGE FORMING APPARATUS AND METHOD IN WHICH PRINTING TIME IS SHORTENED AND PRINTING ENGINE IS NOT DRIVEN UNNECESSARILY, AND RECORDING MEDIUM STORING PROGRAM FOR SAME

INCORPORATION BY REFERENCE

This application is based upon and claims the benefit of priority from the corresponding Japanese Patent Application No. 2007-262915, filed Oct. 9, 2007, the entire contents of which is incorporated herein by reference.

FIELD OF THE INVENTION

The present invention teaches and claims an image forming apparatus, a recording medium, and an image forming method. More specifically, the present invention teaches and claims improvements to an image forming apparatus, a recording medium, and an image forming method which, for example, are well suited for a copying machine and a multifunction machine.

BACKGROUND OF THE INVENTION

Hitherto, as shown in FIG. 4, conventional copying or printing processes were performed in a copying machine, a multifunction machine, or the like. The control sequence described below was performed: A data receiving unit receives a printing job transmitted from a host computer and the associated printing data. The data receiving unit then requests an image forming unit to form an image. The image forming unit then forms an image in response to the request, and also requests a printing engine to start supplying sheets. The printing engine first supplies a sheet from a sheet storage portion so as to deliver the sheet to a resist roller. Then the printing engine secondarily supplies a sheet so as to transfer and fix the image to the sheet. The sheet is delivered on a tray.

However, in order to accelerate the copying or printing process in the copying machine, multifunction machine, or the like, it is necessary to supply sheets in advance by requesting the start of a primary supply of sheets during the receipt or reading of a print job, or accelerate the transportation speed of the primary supply of sheets. However, the print job capacity varies from a small to a large capacity. Therefore, a special device is necessary as to when the primary supply of sheets should be started to accelerate the copying or printing process.

For example, there is the following given technology: simultaneously with the receipt of a print job from the host computer by a printing job receiving unit, the printing engine (which secondarily supplies a sheet supplied primarily from the sheet storage portion, transfers, and fixes a printing image to the sheet) is requested to start supplying a sheet primarily. The image forming unit forms a printing image from the print job received by the printing job receiving unit and outputs the sheet with the printing image formed thereon to the printing engine. Also simultaneously, the secondary supply of sheets starts whereby a printing time in a printer function performing the print job received from the host computer is shortened.

In the above technology, the start of the analysis of image data in the received print job and the start of the primary sheet supply are performed simultaneously. In this case, a request for the secondary sheet supply is made after the completion of image drawing processing of the image data. Therefore, for example, in the case of the print job in which coded image data described in a page description language (PDL) is decoded and the image data is formed, an image processing time becomes uncertain. The image processing time is the time in which the coded image data is decoded to form image data, and each image data is developed into image data on a page basis. Furthermore in this case, the image processing time takes a long time (for example, one or more hours), which makes it necessary to keep the sheet primarily supplied on a transportation path without supplying it secondarily.

SUMMARY OF THE INVENTION

The present invention teaches and claims an image forming apparatus, a recording medium, and an image forming method in which the printing time of a printing job from various input origins can be easily shortened, and a printing engine is not driven unnecessarily.

According to one aspect of the present invention, there is provided an image forming apparatus, comprising a printing engine that secondarily supplies a sheet primarily supplied from a sheet storage portion. The printing engine transfers and fixes image data to the sheet, thereby printing the image on the sheet. A printing job input unit inputs a printing job having the image data and printing setting information which contains at least an amount of the image data and input source information. The image forming apparatus further comprises an image data storing unit that successively stores the image data by dividing the image data into a band basis of a predetermined data amount. Also comprising the image forming apparatus is a job managing unit that outputs, based on the printing setting information, a primary sheet supply band order of the image data and a delivery band order. The primary sheet band order indicates primary sheet supply timing. The delivery band order indicates delivery timing at which the image data can be delivered to the printing engine prior to the secondary sheet supply activated after the primary sheet supply. The apparatus further comprises an image data output control unit that continuously acquires the image data on the band basis from the image data storing unit, outputs primary sheet supply permission information when the acquired image data reaches the primary sheet supply band order, and outputs delivery permission information and the image data to the printing engine when the acquired image data reaches the delivery band order. Finally a printing engine control unit of the image forming apparatus outputs the primary sheet supply permission information and the delivery permission information to the printing engine and controls the primary sheet supply in the printing engine and the delivery of the image data.

According to an another embodiment of the present invention, there is provided an image forming program stored on a recording medium which directs a control computer. The control computer controls printing of the image data from a print job on a sheet by a printing engine that secondarily supplies a sheet primarily supplied from a sheet storage portion, transfers image data to the sheet, and fixes the image data on the sheet. The image forming program directs the control computer to perform print job input processing of the input of a print job having the image data and print setting information containing at least a data amount of the image data and input source information. According to the image forming program, the control computer also performs image data storage processing to successively store image data in an image data storing unit by dividing the image data into a band basis of a predetermined data amount. The control computer further performs band order processing of output based on the print setting information, a primary sheet supply band order of the image data and a delivery band order. The primary sheet supply band order indicates primary sheet supply timing. Delivery band order indicates a delivery timing at which the image data can be delivered to the printing engine prior to the secondary sheet supply activated after the primary sheet supply. Image data output control processing is also performed according to the program on continuously acquiring image data on a band basis from the image data storing unit. Then the control computer also performs outputting of primary sheet supply permission information when the acquired image data reaches the primary sheet supply band order, and outputting of delivery permission information and the image data to the printing engine when the acquired image data reaches the delivery band order. Finally, the control computer performs print engine control processing on an output of the primary sheet supply permission information and the delivery permission information to the printing engine, and performs controlling of the primary sheet supply in the printing engine and the delivery of the image data.

According to yet another aspect of the present invention, there is provided an image forming method using a control computer. The control computer controls printing of image data from a print job on a sheet by a printing engine that secondarily supplies a sheet that is primarily supplied from a sheet storage portion. The control computer also transfers image data to the sheet, fixes and prints the image data on the sheet. The image forming method consists of the control computer performing a print job by inputting an input process of a print job, the input including but not limited to image data and print setting information. The print setting information contains at least data from the image data and input source information. Next, according to a method of the present invention, the control computer performs image data, stores processing of the successively stored image data in an image data storing unit by dividing the image data into a band basis of a predetermined data amount. Then the band orders processing of output based on the print setting information, a primary sheet supply band order of the image data, and based on a delivery band order. The primary sheet supply band order indicates primary sheet supply timing. The delivery band order indicates a delivery timing at which the image data can be delivered to the printing engine prior to the secondary sheet supply activated after the primary sheet supply. The method in accordance of the present invention further includes but is not limited to the control computer performing image data output control processing of continuously acquiring the image data on the band basis from the image data storing unit then outputting primary sheet supply permission information when the acquired image data reaches the primary sheet supply band order, and outputting delivery permission information and the image data to the printing engine when the acquired image data reaches the delivery band order. Finally, according to the method of the present invention, the control computer performs print engine control processing of outputting the primary sheet supply permission information and delivers permission information to the printing engine, then controls the primary sheet supply in the printing engine and the delivery of the image data.

Other objects of the present invention and specific advantages obtained by the present invention are further explained by the detailed description of the following various aspects of the embodiments.

BRIEF DESCRIPTION OF THE DRAWINGS

The following detailed description, given by way of example, but not intended to limit the invention solely to the specific embodiments described, may best be understood in conjunction with the accompanying drawings, in which:

FIG. 2 is a diagram illustrating management information on the image forming apparatus as shown in FIG. 1;

DETAILED DESCRIPTION OF THE PREFERRED EMBODIMENTS

Hereinafter, a preferred embodiment according to the present invention is described with reference to the drawings.

Figure 1:
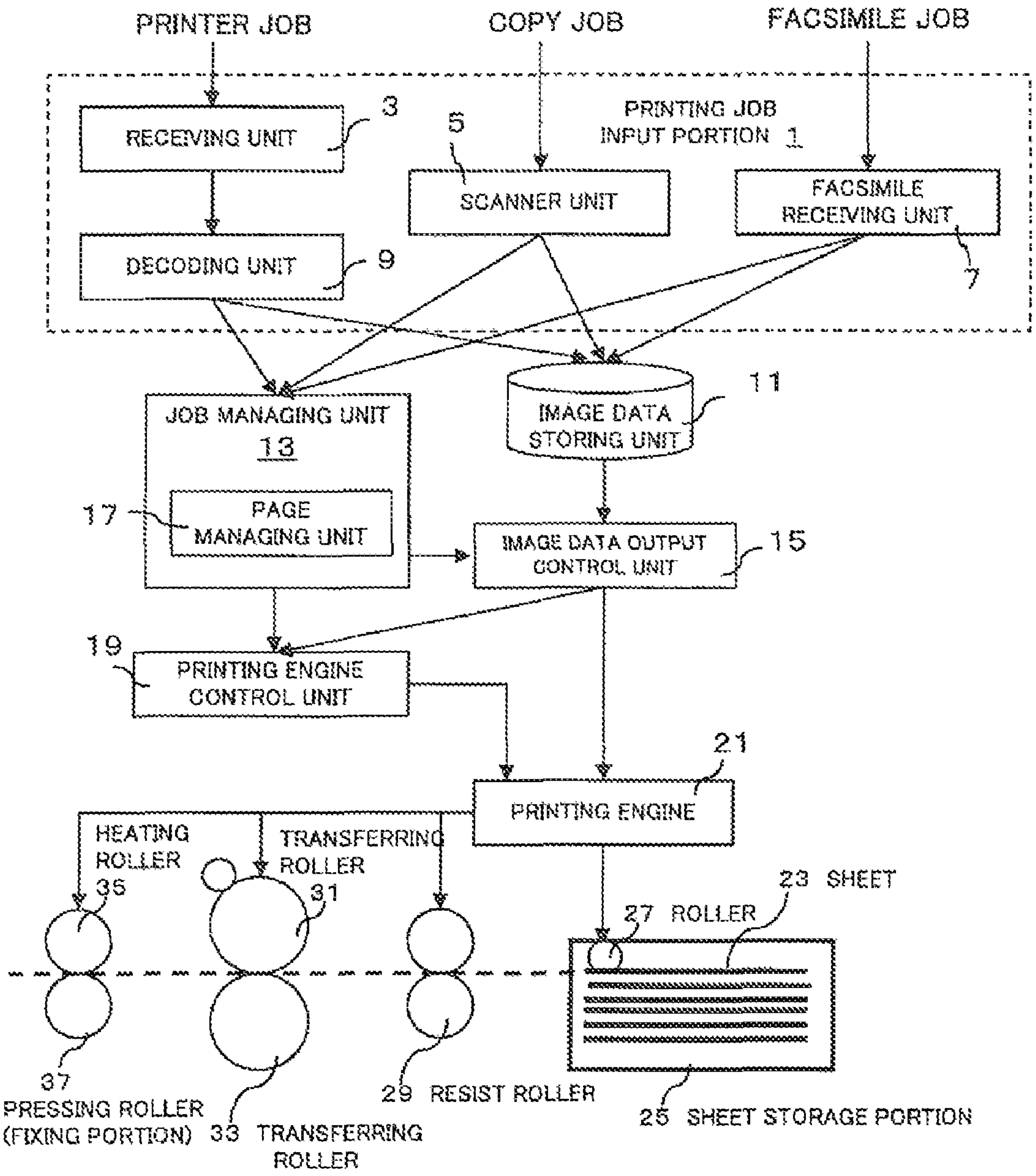
FIG. 1 is a block diagram of an image forming apparatus according to an embodiment of the present invention.

FIG. 1 is a block diagram showing an embodiment of an image forming apparatus according to the present invention.

In FIG. 1, a print job input unit 1 has a function for inputting various print jobs (a printer job, a copy job, or a facsimile job). For example, the print job includes a receiving unit 3, a scanner unit 5, a facsimile receiving unit 7, and a decoding unit 9.

The receiving unit 3 has an interface function for receiving and inputting a print job from a host computer via a network (not shown) and outputs the input print job to the decoding unit 9.

The scanner unit 5 is an image reading unit which optically reads images from a plurality of printed originals and subjects the images to filtering and the like, in order to generate the print job as image data. The facsimile receiving unit 7 is a communication unit for receiving a facsimile signal as an external print job from a facsimile (not shown) unit via a public line. The scanner unit 5 and the facsimile receiving unit 7 are connected to image data storing unit 11 and job managing unit 13.

The decoding unit 9 decodes code image data described in a page description language ("PDL") in a print job and converts the print job into image data. The decoding unit 9 is connected to the image data storing unit 11 and the job managing unit 13.

The print job that inputs through the receiving unit 3, the scanner unit 5, or the facsimile receiving unit 7 includes image data itself. The print job input also includes printing setting information containing input source information that indicates data size and the discrimination of a printer job, a copy job, or a facsimile job before the image data.

The image data storing unit 11 is a reading/writing hard disk that divides the image data in a print job into bands each having a predetermined data size (for example, 200 lines) and successively records and stores them. The image data storing unit 11 is connected to image data output control unit 15. Since the size of image data varies depending on printing sheet size, a resolution, an image gray-scale value, etc., the band-based data amount can also be set on an image data basis.

The job managing unit 13 identifies a printer job, a copy job, or a facsimile job based on the printing setting information in a print job, and in particular, inputs source information indicating the discrimination of a printer job, a copy job, or a facsimile job.

Page managing unit 17 is contained in job managing unit 13 and has a function for calculating a primary sheet supply band order of image data and a delivery band order. The primary sheet supply band order indicates a primary sheet supply timing. The delivery band order indicates delivery timing at which the image data can be delivered to a printing engine 21 (described later) before secondary sheet supply is activated after the primary sheet supply, with respect to the printing engine 21 based on the printing setting information. The job managing unit 13 is connected to the image data output control unit 15 and the printing engine control unit 17.

More specifically, the job managing unit 13 grasps the data size of image data of each print job, and calculates a band amount (number) into which the image data is divided. On the other hand, job managing unit 13 has a function for identifying whether the print job is a printer job, a copy job, or a facsimile job. Job managing unit also calculates a primary sheet supply band order (M-th band) and a delivery band order (N-th band) corresponding to the input origin in accordance with management information described later.

In the case of a printer job, as indicated by the management information shown in FIG. 2, job managing unit 13 calculates a band order. For example, at a time of the three-fourths completion of conversion from the whole coded image of one page into image data as an M-th band. For example in the scenario that the M-th is 20th band, this indicates the image data is broken into at least 20 bands. The job managing unit 13 also calculates the N-th band for the delivery band order. This maybe calculated as, for example, two bands before the last band, which is in the vicinity of the last band, as the N-th band, in the conversion from the coded image data into image data.

In the printer job scenario, since coded image data described in a PDL of a print job is decoded and then converted into image data, it takes a long time to create image data. Therefore, the timing of primary sheet supply is delayed, set to be the 20th band. Or in other words, the timing is delayed until the 20-th band is calculated. During the delay the coded image data is converted into image data. Such a control can prevent a primarily supplied sheet from being stopped in a transportation path for a prolonged period of time.

Further, from an empirical rule which states that there is no image (only white data) in the vicinity of the last band in most cases, job managing unit 13 sets a band at a certain time. The time being when the conversion of a last portion of image data that is not white data is completed in the image coded data of one page of the print job as a band order for discharging the image data to the printing engine 21. Then job managing unit 13 calculates two bands before the last band. Due to such a control, printing time is shortened, and overrun in which the delivery of the image data to the printing engine 21 being late for secondary sheet supply can be prevented.

In the case of a copy job, the job managing unit 13 assigns a 0-th band as an M-th band, and calculates, for example, a 10th band as an N-th band from a scanning speed and the speed at which image data is sent to the printing engine 21.

In the case of a copy job, image data is formed at a constant scanning speed immediately after a copy start button is pressed. Therefore, primary sheet supply is started immediately after the copy start button is pressed. Image data is delivered to the printing engine 21 at a time of the 10th band. Therefore, printing time can be shortened without allowing a primarily supplied sheet from being stopped in a transportation path for a long period of time. Herein, the 0th band refers to the state where there is no image data in the image data storing unit 11. For example, the other band refers to the state immediately after the copy start button is pressed. Further, calculating the value at the N-th band from the scanning speed and the speed at which image data is sent to the printing engine 21 is to calculate the value of the N-th band at which image data is delivered. The calculation takes into account the difference in speed, since the scanning speed is lower than the speed at which image data is sent to the printing engine 21. Since the above-mentioned overrun is likely to occur as the speed difference is larger (for example, the scanning speed is lower), the job managing unit 13 calculates a larger value as the value of the N-th band so as to prevent overrun.

In the case of a facsimile job, the job managing unit 13 calculates, for example, the 5th band in the vicinity of the first band as an M-th band. Job managing unit 13 also calculates a band at which the acquisition of the last portion of the image data that is not white data can be completed, for example, two bands before the last band as an N-band.

In the case of a facsimile job, image data is directly sent as the timing of primary sheet supply. It is not necessary to consider a time for converting coded image data into image data as in the printer job. However, when a 0th band is assigned, as in the copy job, there is a time delay due to a communication time. Thus the reception timing of image data becomes late for the primary sheet supply timing. Particularly, in the case where the amount of image data to be sent is large, and the communication speed of image data in the facsimile receiving portion 7 is low, a primarily supplied sheet is stopped in a transportation path for a long period of time. Therefore, by delaying the timing to supply the primary sheet by calculating it at a 5th band, image data may be received during that time. Due to such control, a primarily supplied sheet can be prevented from being stopped in a transportation path for a prolonged period of time.

Furthermore, the job managing unit 13 calculates, for example, two bands before the last band as a band at a time when the acquisition of the last portion of the image data that is not white data can be completed in the image data of one page in the printing job. The band is calculated therefore as the timing for discharging image data to the printing engine 21. Due to such control, the above-mentioned overrun can be prevented while a printing time is shortened.

In the image forming apparatus of the present invention, other embodiments may have the primary sheet supply band order and the delivery band order not limited to the above band orders.

For example, in a printer job, the job managing unit 13 may calculate the band order at the time of completion of the one-half or more conversion of image coded data of one page to image data as the primary sheet supply band order. The calculation is based on the amount of data of image data. As the image data amount becomes larger with the conversion speed from image coded data to image data in the decoding unit 9 becoming low, and with the transmission speed of image data to the printing engine 21 becoming low, it becomes necessary to delay the timing of primary sheet supply. Therefore, a larger value is calculated as the value of the primary sheet supply band order.

Similarly, in the case of a facsimile job, the job managing unit 13 may calculate 1 to 10 bands as the primary sheet supply band order, based on the amount of image data to be sent. As the amount of image data to be sent becomes larger, the communication speed of image data in the facsimile receiving portion 7 becomes low, and further, the transmission speed of the image data to the printing engine 21 also becomes low, and it becomes necessary to delay the timing of primary sheet supply. Therefore, a larger value is calculated as the value of the primary sheet supply band order.

Further, in the case of a printer job, the job managing unit 13 calculates two bands before the last band. The two bands are calculated as the band at a time of the completion of the conversion of the last portion of image data that is not white data in the image coded data of one page in the printing job. The two bands are calculated as the delivery band order.

However, the job managing unit 13 may calculate 3 to 5 bands before the last band as the delivery band order.

In the case of a facsimile job, the job managing unit 13 calculates two bands before the last band. The two bands are calculated as the band at a time when the acquisition of the last portion of image data that is not white data can be completed in the image data of one page in the printing job. The two bands are calculated as the delivery band order. However, the job managing unit 13 may calculate 3 to 5 bands before the last band as the delivery band order.

As described above, a primary sheet supply band order of image data indicates a primary sheet supply timing and a delivery band order indicates a delivery timing at which the image data can be delivered to the printing engine 21 before secondary sheet supply activated after the primary sheet supply may be calculated with respect to the printing engine 21. The calculation is based at least on the amount of image data in a print job and input source information indicating the discrimination between a printer job, a copy job, or a facsimile job, and considers the processing ability (processing speed) and the like of the printing engine 21.

Next, returning to FIG. 1, the image data output control unit 15 has an image processing function to continuously acquire image data on a band basis from the image data storing unit 11. The image data output control unit also forms printing image data made of, for example, image data on one page basis. Then, the image data output control unit 15 processes the images and creates printing image data, after receiving an instruction to process the images from the job managing unit 13 based on the printing setting information.

The image data output control unit 15 outputs primary sheet supply permission information to the printing engine control unit 19 when the acquired image data reaches the primary sheet supply band order (M-th band). It also outputs delivery permission information to the printing engine control unit 19 when the acquired image data reaches a delivery band order. Then, the image data output control unit 15 uses a function to output printing image data to the printing engine 21 when it outputs the delivery permission information.

The printing engine control unit 19 outputs printing setting information from the job managing unit 13, for example, various pieces of information such as the number of copies to the printing engine 21. Then, the printing engine control unit 19 contains a function to output the primary sheet supply permission information and the delivery permission information from the image data output control unit 15 to the printing engine 21. The printing engine control unit 19 controls the primary sheet supply of the printing engine and the delivery of image data.

The printing engine 21 controls a sheet storage portion 25 in which sheets 23 are set, a roller 27 for primarily supplying sheets 23 from the sheet storage portion 25, and the feed timing of the primary supplied sheet in midstream. The printing engine 21 also includes but is not limited to a resist roller 29 for adjusting a position, transfer rollers 31 and 33 for transferring an image to the sheet 23 secondarily supplied from the resist roller 29, a fixing unit of a heating roller 35, a pressing roller 37 for heating and pressing the sheet 23 with the image transferred, and finally an electronic circuit with a driving mechanism (not shown) for drive controlling them.

In order to facilitate better understanding of the present invention, in the printing engine 21, the sheets 23, the sheet storage portion 25, the roller 27, the resist roller 29, the transfer rollers 31 and 33, the heating roller 35, and the pressing roller 37 are shown separately from the printing engine 21.

Upon receiving an instruction to start the primary sheet supply, the printing engine 21 primarily supplies the sheet 23 from the sheet storage portion 25 by using roller 27 and transports the sheet 23 to the resist roller 29. Then, when delivery permission information is received, and the transfer of an image to the transfer rollers 31 and 33 becomes ready based on image data, the resist roller 29 secondarily supplies the sheet 23 in standby position due to a timing control. Furthermore, an image is transferred to sheet 23 by the transfer rollers 31 and 33, the image is fixed by the heating roller 35 and the pressing roller 37. The sheet 23 is then delivered.

Various functions performed by the printing job input unit 1, the image data storing unit 11, the job managing unit 13, the image data output control unit 15, the printing engine control unit 19, and one unit of the printing engine 21 are realized by software.

Figure 3:
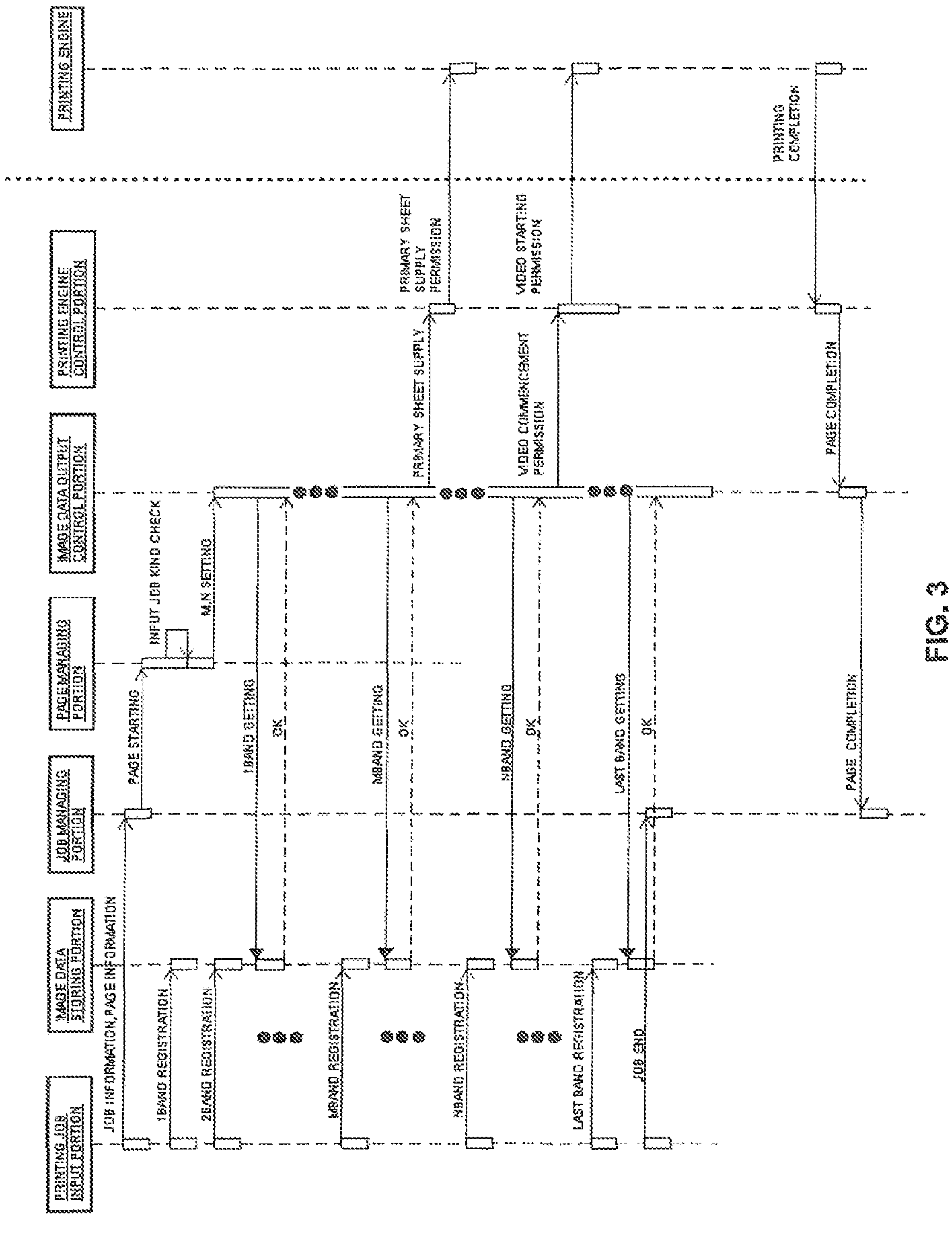
FIG. 3 is a diagram illustrating the operation of the image forming apparatus as shown in FIG. 1.
Figure 4:
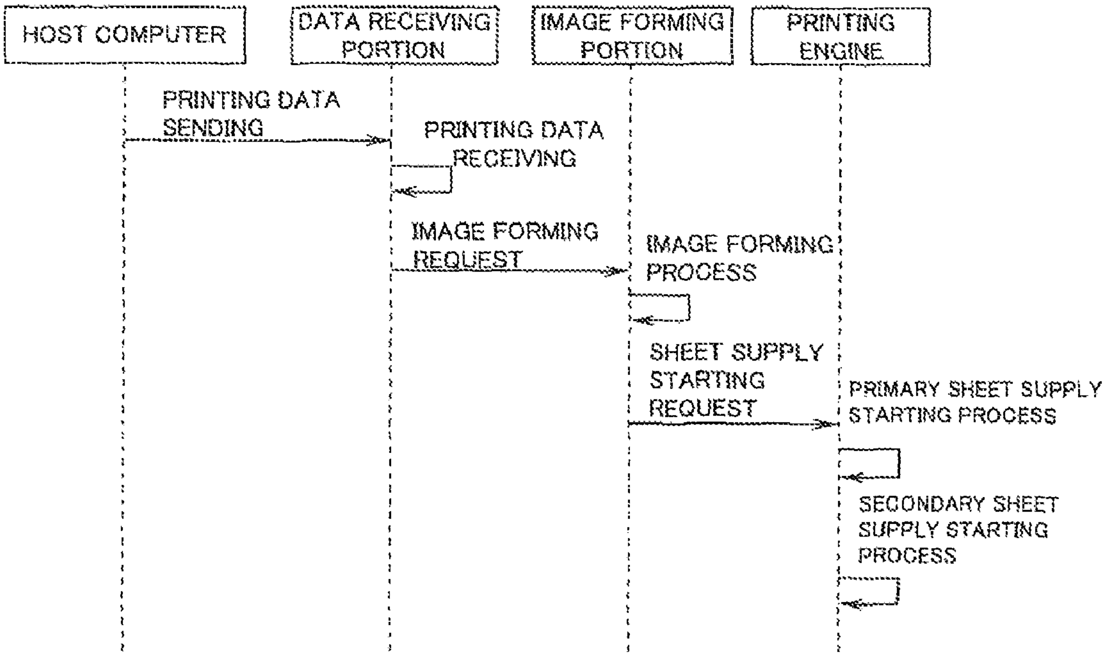
FIG. 4 (PRIOR ART)
FIG. 4 is a diagram illustrating the operation of a conventional image forming apparatus.

Next, the operation of the above image forming apparatus is described with reference to FIG. 3.

As an example, the printing of a printer job is described. In FIG. 3, a job, a band, a page, and an image delivery are displayed with terms "Job", "Band", "Page", and "Video", respectively.

A printer receives a print job from a print job input unit 1, as the input origin is converted from code information to image data. The image data is then output to the image data storing unit 11. Print setting information (Job information, Page information) in the printing job are output to the job managing unit 13.

The image data storing unit 11 divides the image data in the print job into a band basis of a predetermined data amount, and continuously registers and stores from 1 band to Lastband one by one.

On the other hand, the job managing unit 13 identifies print setting information ("Input Job Kind Check") in the print job and identifies input source information indicating a printer. The job managing unit 13 assigns a 20th band as a primary sheet supply band order (M-th band) of image data which sets the primary sheet supply timing with respect to the printing engine 21 based on the information. The job managing unit 21 calculates two bands before a last band ("Lastband") as a delivery band order (N-th band) which sets a delivery time at which image data can be delivered to the printing engine 21. Finally the job managing unit 13 outputs it to the image data output control unit 15.

The image data output control unit 15 continuously acquires image data on a band basis from the image data storing unit 11 to form printing image data. It also outputs primary sheet supply permission information to the printing engine control unit 19 when the acquired image data reaches the M-th band. In addition it outputs delivery ("Video") permission information to the printing engine control unit 19 when the acquired image data reaches N-th band before, and outputs printing image data to the printing engine 21 when outputting the delivery ("Video") permission information.

The printing engine control unit 19 outputs the primary sheet supply permission information and the delivery ("Video") permission information from the image data output control unit 15 to the printing engine 21, thereby controlling the primary sheet supply of the printing engine and the delivery of image data.

In the printing engine 21, the sheet 23 is primarily supplied from the sheet storage portion 25 based on the primary sheet supply permission information. The primarily supplied sheet 23 has the feed timing controlled by the resist roller 29 and the like in midstream. Delivery permission information is input, and thereafter, the sheet 23 is secondarily supplied from the resist roller 29 at a predetermined timing. An image is transferred to the sheet 23 by the transfer rollers 31 and 33. The sheet 23 with image transferred thereto is accomplished by the fixing unit of the heating roller 35 and the pressing roller 37. The sheet 23 is then delivered.

The above procedure is performed by a recording medium and an image forming method of the present invention. Further, regarding a copy job and a facsimile job, the primary sheet supply permission information and the delivery permission information are output in accordance with the management information shown in FIG. 2. Printing processing is performed similarly.

Consequently, the image forming apparatus according to the present invention includes but is not limited to the following: Printing engine 21 that secondarily supplies a sheet 23, which is primarily supplied from the sheet storage portion 25, and prints image data. Printing job input unit 1 that inputs a print job having the image data and printing setting information containing at least the data size of the image data and input source information. Image data storing unit 11 that continuously stores the image data is accomplished by dividing the image data into a band basis of a predetermined data amount. Job managing unit 13 that outputs, based on the input source information in the printing setting information, a primary sheet supply band order regarding the image data indicating a primary sheet supply timing in accordance with the input origin, and a delivery band order indicating a delivery timing at which the image data can be delivered to the printing engine 21 before the secondary sheet supply subsequent to the primary sheet supply. Image data output control unit 15 that continuously acquires image data on a band basis from the image data storing unit 11 and outputs primary sheet supply permission information when the acquired image data reaches the primary sheet supply band order, and outputs delivery permission information and the image data to the printing engine 21 when the acquired image data reaches the delivery band order. Printing engine control unit 19 that outputs the primary sheet supply permission information and the delivery permission information to the printing engine 21, thereby controlling the primary sheet supply and the delivery of the image data.

Therefore, the printing time of print jobs from various input origins can be shortened. Even if the processing time of expanding image-data from a print job is prolonged, the primary sheet supply timing is set and the delivery of image data is controlled accordingly. Therefore a primarily supplied sheet is not allowed to be stopped in a transportation path for a long period of time without being secondarily supplied.

In general, when a sheet is stopped in a transportation path while being primarily supplied, in order to prepare for the presumed immediate formation of an image, it is necessary to continue to run a motor for driving a roller and the like on the transportation path for transporting a sheet, and also continue to keep the temperature of the fixing roller high.

Thus, according to the variation of embodiments of the present invention, the driving motor for transporting a sheet can be suppressed so as not to supply a sheet. It is also not necessary to maintain a high fixing temperature for the fixing roller. More specifically, power consumption can be reduced to prevent adverse effects on the mechanical strength of the roller, the fixing roller, and the like on the transportation path.

Further, according to additional embodiments of the present invention, a printing job contains the discrimination between a printer job, a copy job, or a facsimile job as input source information. The job managing unit acquires a primary sheet supply band order and a delivery band order in accordance with the input source information. Consequently, the printing time can be shortened in accordance with the print job from the input origin.

The image forming apparatus according to further embodiments of the present invention can be applied to various printing appliances, in addition to a printer, a copying machine, a facsimile, or a multifunction machine that is a combination thereof. In particular, the image forming apparatus is preferable in a printer in which capacities for individual print jobs vary.

Having thus described in detail preferred embodiments of the present invention, it is to be understood that the invention defined by the foregoing paragraphs is not to be limited to particular details and/or embodiments set forth in the above description, as many apparent variations thereof are possible without departing from the spirit or scope of the present invention.

What is claimed is:

1. An image forming apparatus comprising:

a printing engine that secondarily supplies a sheet primarily supplied from a sheet storage portion, and transfers and fixes image data to the sheet;

a print job input unit that inputs a print job having the image data and printing setting information;

an image data storing unit that continuously stores the image data by dividing the image data on a band basis of a predetermined data amount;

a job managing unit that outputs, based on the printing setting information, a primary sheet supply numerical order of the band and an image data delivery numerical order of the band;

an image data output control unit that continuously acquires the image data on the band basis from the image data storing unit, outputs primary sheet supply permission information and delivery permission information of the image data to a printing engine control unit, and outputs the image data to the printing engine; and the printing engine control unit that outputs the primary sheet supply permission information and the delivery permission information of the image data to the printing engine, and controls the primary sheet supply in the printing engine and the delivery of the image data.

2. The image forming apparatus according to claim 1, wherein the printing setting information includes at least one of a data size of the image data and input source information.

3. The image forming apparatus according to claim 1, wherein the primary sheet supply numerical order of the band indicates primary sheet supply timing and the image data delivery numerical order of the band indicates delivery timing at which the image data can be delivered to the printing engine between a secondary sheet supply timing and the primary sheet supply timing.

4. The image forming apparatus according to claim 1, wherein the image data output control unit outputs the primary sheet supply permission information when the acquired image data reaches the primary sheet supply numerical order of the band, and outputs the delivery permission information of the image data and the image data when the acquired image data reaches the image data delivery numerical order of the band.

5. The image forming apparatus according to claim 2, wherein the job managing unit outputs based on at least one of the data size of the image data and the input source information, the primary sheet supply numerical order of the band and the image data delivery numerical order of the band.

6. The image forming apparatus according to claim 5, wherein the input source information indicates that the print job is a printer job, and the job managing unit sets a band to be a value of the primary sheet supply numerical order of the band at a time when conversion of one-half or more of image code data of one page of the print job into the image data is completed.

7. The image forming apparatus according to claim 5, wherein the input source information indicates that the print job is a printer job, and the job managing unit sets a band to be a value of the image data delivery numerical order of the band at a time when conversion of a last portion of image code data of one page of the print job that is not white data into the image data is completed.

8. The image forming apparatus according to claim 5, wherein the input source information indicates that the print job is a printer job, and the job managing unit sets one of 2 to 5 bands before a last band to be a value of the image data delivery numerical order of the band.

9. The image forming apparatus according to claim 5, wherein the input source information indicates that the print job is a copy job, and the job managing unit sets 0 band to be a value of the primary sheet supply numerical order of the band.

10. The image forming apparatus according to claim 5, wherein the input source information indicates that the print job is a copy job, and the job managing unit calculates a value of the image data delivery numerical order of the band based on a scanning speed of a scanner unit and a speed at which the image data is sent to the printing engine.

11. The image forming apparatus according to claim 5, wherein the input source, information indicates that the print job is a copy job, and the job managing unit calculates a value of the image data delivery order of the band based on a difference between a scanning speed of a scanner unit and a speed at which the image data is sent to the printing engine.

12. The image forming apparatus according to claim 5, wherein the input source information indicates that the print job is a facsimile job, and the job managing unit sets one of 1 to 10 bands to be a value of the primary sheet supply numerical order of the band.

13. The image forming apparatus according to claim 5, wherein the input source information indicates that the print job is a facsimile job, and the job managing unit sets a band to be a value of the image data delivery numerical order of the band at a time when acquisition of a last portion of image data of one page of the print job that is not white data is completed.

14. The image forming apparatus according to claim 5, wherein the input source information indicates that the print job is a facsimile job, and the job managing unit sets 2 to 5 bands before a last band to be a value of the image data delivery order of the band.

15. A non-transitory recording medium that is readable by a computer and that stores an image forming program allowing a control computer, which controls printing of image data from a printing job on a sheet by a printing engine that secondarily supplies a sheet primarily supplied from a sheet storage portion, transfers image data to the sheet, fixes and prints the image data on the sheet, to perform an operation comprising:

printing job input process of printing job input having the image data and printing setting information including at least one of a data size of the image data and input source information;

image data storing process of successively storing the image data in an image data storing unit by dividing the image data on a band basis of a predetermined data amount;

band order process of outputting, a primary sheet supply numerical order of the band and an image data delivery numerical order of the band;

image data output control process of successively acquiring image data on the band basis from the image data storing unit, outputting primary sheet supply permission information and delivery permission information of the image data to a printing engine control unit, and outputting the image data to the printing engine; and printing engine control process of outputting the primary sheet supply permission information and the delivery permission information of the image data to the printing engine, and controlling the primary sheet supply in the printing engine and the delivery of the image data.

16. An image forming method causing a computer to control printing of image data from a print job on a sheet by a printing engine that secondarily supplies a sheet primarily supplied from a sheet storage portion, transfers image data to the sheet, fix and print the image data on the sheet to perform an operation comprising:

printing job input processing of inputting a print job having the image data and printing setting information including at least one of a data size of the image data and input source information;

image data storing processing of continuously storing the image data in an image data storing unit by dividing the image data on a band basis of a predetermined data amount;

band order processing of outputting a primary sheet supply numeric order of the band and an image data delivery numerical order of the band;

image data output control processing of continuously acquiring the image data on the band basis from the image data storing unit, outputting primary sheet supply permission information and delivery permission information of the image data to a printing engine control unit, and outputting the image data to the printing engine; and printing engine control processing of outputting the primary sheet supply permission information and the delivery permission information of the image data to the printing engine, and controlling the primary sheet supply in the printing engine and the delivery of the image data.

17. The image forming apparatus according to claim 5, wherein the input source information indicates that the print job is a printer job, and the job managing unit calculates a larger value of the primary sheet supply numerical order of the band as the data size of the image data is larger.

18. The image forming apparatus according to claim 5, wherein the input source information indicates that the print job is a facsimile job, and the job managing unit calculates a larger value of the primary sheet supply numerical order of the band as the data size of the image data is larger.

* * * * *